United States Patent [19]

Tierney et al.

[11] Patent Number: 5,818,426
[45] Date of Patent: Oct. 6, 1998

[54] PERIPHERAL-COMPUTER INTERFACING SYSTEM AND METHOD

[75] Inventors: T. Kirkwood Tierney, Schomberg; David J. Van Tuyl, Holland Landing, both of Canada

[73] Assignee: Aztech New Media Corporation, Ontario, Canada

[21] Appl. No.: 653,074

[22] Filed: May 21, 1996

Related U.S. Application Data

[63] Continuation-in-part of Ser. No. 595,356, Feb. 1, 1996, abandoned.

[51] Int. Cl.[6] ........................................................ G06F 3/00
[52] U.S. Cl. .................................... 345/161; 395/893
[58] Field of Search .................................. 341/20, 22, 26; 345/156–185, 161, 168–169; 395/892–893

[56] References Cited

U.S. PATENT DOCUMENTS

| | | | |
|---|---|---|---|
| 4,306,232 | 12/1981 | Burson | 340/706 |
| 4,493,992 | 1/1985 | Geller | 250/112 |
| 4,502,039 | 2/1985 | Vercesi et al. | 341/26 |
| 4,588,187 | 5/1986 | Dell | 273/1 E |
| 4,721,308 | 1/1988 | Trimble | 273/148 B |
| 4,868,780 | 9/1989 | Stern | 364/900 |
| 4,870,389 | 9/1989 | Ishiwata et al. | 340/709 |
| 4,886,941 | 12/1989 | Davis et al. | 178/18 |
| 4,906,843 | 3/1990 | Jones et al. | 250/221 |
| 4,924,216 | 5/1990 | Leung | 340/709 |
| 4,988,981 | 1/1991 | Zimmerman et al. | 340/709 |
| 4,994,795 | 2/1991 | MacKenzie | 340/710 |
| 5,128,671 | 7/1992 | Thomas, Jr. | 341/20 |
| 5,134,395 | 7/1992 | Stern | 347/20 |
| 5,146,566 | 9/1992 | Hollis, Jr. et al. | 395/893 |
| 5,208,582 | 5/1993 | Hwang | 340/706 |
| 5,245,320 | 9/1993 | Bouton | 345/167 |
| 5,260,697 | 11/1993 | Barrett et al. | 345/173 |
| 5,287,121 | 2/1994 | Louis et al. | 345/179 |
| 5,298,918 | 3/1994 | Yen-Chen et al. | 345/163 |
| 5,305,449 | 4/1994 | Ulenas | 395/500 |
| 5,396,267 | 3/1995 | Bouton | 395/168 |
| 5,404,458 | 4/1995 | Zetts | 395/893 |
| 5,421,590 | 6/1995 | Robbins | 273/438 |
| 5,451,983 | 9/1995 | Poivet | 345/157 |
| 5,459,487 | 10/1995 | Bouton | 345/156 |
| 5,551,701 | 9/1996 | Bouton | 463/36 |
| 5,648,797 | 7/1997 | Lam | 345/161 |

FOREIGN PATENT DOCUMENTS

| 94/16426 | 7/1994 | WIPO . |
|---|---|---|

OTHER PUBLICATIONS

D. Sheingold *Analog–Digital Conversion Handbook*, 3rd Ed. © 1986, (Analog Device Inc.), pp. 199–203 (Best Available Copy).

*Primary Examiner*—Lance Leonard Barry
*Attorney, Agent, or Firm*—Stern, Kessler, Goldstein & Fox P.L.L.

[57] ABSTRACT

The present invention provides a method and apparatus for communicating peripheral input information through a game adapter interface to a personal computer processor. A controller reads switch signals output from one or more switch arrays to detect switch activity. The controller conditions and outputs digital switch activity signals representative of the detected switch activity. A multiplexer multiplexes the digital switch activity signals output from the controller to obtain a corresponding analog switch activity signal. The type of switch activity detected by the controller can include the first switch to be activated among contending slammers and/or the current activation state of an array of selector switches. The controller includes a signal conditioner which asserts digital switch activity signals for a predetermined duration to enable a steady-state analog switch signal to be polled by a personal computer processor. In this way, even rapid, momentary peripheral inputs through the switches are detected by a heavily-loaded PC processor through the game adapter interface. The controller further outputs a digital report signal such as a semaphore indicating either an active multiplexing condition or a calibration period. During calibration, the controller outputs a sequence of digital signals having different binary values such that a respective multiplexer outputs a profile of analog values covering the range of different switch activities.

29 Claims, 8 Drawing Sheets

PERIPHERAL-COMPUTER INTERFACING SYSTEM AND METHOD

CROSS REFERENCE TO RELATED APPLICATION

This Application is a continuation-in-part of application Ser. No. 08/595,356, filed Feb. 1, 1996, entitled "A Peripheral-Computer Interfacing System and Method," by Tierney et al., now abandoned.

BACKGROUND OF THE INVENTION

1. Field of the Invention

The present invention relates to an interface between a peripheral input device and a computer. More particularly, the present invention relates to a method and apparatus for communicating peripheral inputs from an array of signaling switches to a personal computer through a game adapter interface.

2. Related Art

The personal computer (PC) supports joystick-type peripheral devices through a "game adapter interface." The game adapter interface has historically been placed on an independent bus adapter card. Now, multi-function cards, such as those providing multimedia capabilities for a PC, include the game adapter interface. Game adapter interfaces are found in most types of personal computers which support joystick-type peripheral devices including IBM, IBM PC-compatible, and Apple computers.

FIG. 1 illustrates a typical game adapter interface 100 implemented using minimal circuitry 102 inside the PC and connected to the external world via a game adapter interface connector 104, i.e. a 15-pin D-shell type socket connector. FIG. 2 further shows the individual pins 1 to 15 which exist in the game adapter interface connector 104.

A number of different electrical connections are made through this game adapter interface connector 104 to provide communication between a peripheral device and the PC. In particular, four switch sensing lines (pins 4, 5, 10, and 14) and four resistive input lines (pins 3, 6, 11, and 13) are used to connect a common peripheral input (such as a joystick or dual joysticks) to a game adapter interface. Voltage sources (pins 1 and 9) and ground sources (pins 4, 5, and 12) are also connected through the game adapter interface connector 104. These game adapter interface connections for a dual joystick-type peripheral having two joysticks 1 and 2, each with a button A and B, are summarized in Table 1 below:

TABLE 1

| Pin | Name | Type of Connection |
|-----|------|--------------------|
| 1 | XY1 (+5 v) | +5 v supply |
| 2 | Switch 1 | Ground (Gnd) = pressed |
| 3 | X1 | Resistive value between 0 and 100 k ohms |
| 4 | Switch 1 (GND) | Gnd for Button A and Joystick 1 |
| 5 | Switch 2 (GND) | Gnd for Button A and Joystick 2 |
| 6 | Y1 | Resistive value between 0 and 100 k ohms |
| 7 | Switch 2 | Gnd = pressed |
| 8 | Not Connected | |
| 9 | XY2 (+5 v) | +5 v Supply |
| 10 | Switch 4 | Gnd = pressed |
| 11 | X2 | Resistive value between 0 and 100 k ohms |
| 12 | Switch 3 & 4 (GND) | Gnd for Button B on each Controller |
| 13 | Y2 | Resistive value between 0 and 100 k ohms |
| 14 | Switch 3 | Gnd = pressed |
| 15 | Not Connected | |

In a typical joystick, a signaling switch is pressed momentarily to effect a simple make-or-break connection. A switch signal then passes over a connector pin reserved for the switch to the game adapter interface. Game adapter interface hardware 102 in the PC converts the switch signal into a binary digital value representing the momentary switch input. Two resistive inputs communicate joystick position information for x and y axis. Two variable resistors are mechanically tied to the control stick. The resistance of the two resistors varies between 0 and 100,000 ohms in response to horizontal (x) and vertical (y) motions respectively. The game adapter interface hardware 102 in the PC senses the resistive input changes and generates a digital pulse with a duration relatively proportional to the resistive load. The PC can then measure the duration of the pulse to establish the relative position of the control stick.

The PC can support only a single game adapter interface; thus, the game adapter interface 100 can only handle up to four signaling switches and up to four resistive inputs. Such a full implementation is referred to a full-port adapter. However, many game adapter interfaces were manufactured with hardware support for two resistive analog inputs and two switches also called a half-port adapter. These half-port adapters are not easily detected from the exterior of a PC. Any peripheral device which relies on a full implementation of the game adapter interface is subject to installment problems when a half-port adapter is encountered. Thus, to enable the widest application, a peripheral device is limited to passing two digital inputs and two analog inputs through a game adapter interface.

Further, the game adapter interface is a non-interrupting device which does not use an interrupt (IRQ), a Direct Memory Access (DMA) channel, or PC (RAM) memory. A single I/O address is used. This minimizes the impact of the game adapter interface on the PC and allows the game adapter interface to work across diverse arrangements without conflicts being an issue. Because of the non-interrupt design, a processor must poll momentary peripheral inputs to a game adapter interface when the inputs are present, otherwise, the inputs will not be detected.

A PC operating system, however, can have difficulty in polling a non-interruptive game adapter interface. Such operating systems have a latency period for response and sometimes cannot guarantee that they will be able to read peripheral inputs in a timely manner. This latency problem is much more acute in situations where the PC processor is heavily-loaded, the duration of momentary peripheral inputs is brief, or multiple peripheral inputs arrive at about the same time. For example, when a PC processor runs a multi-media movie element concurrently with a gaming application, momentary signals are not detected accurately when their duration is shorter than the length of time it takes for a PC processor to switch contexts to poll the game adapter interface inputs.

A heavily-loaded PC processor also has difficulty discriminating a sequence of peripheral inputs which arrive simultaneously or nearly-simultaneously through a non-interruptive game adapter interface. In certain gaming applications, contention detection, that is detecting the order in which player buttons are pressed, can be critical. Thus, the game adapter interface limits effective playing of certain games on a heavily-loaded PC processor.

As discovered by the inventors, another aspect of the treatment of game adapter interface on some personal computers is that the reading reported to the application software for a particular resistive input on one channel is often affected by the value of the resistive inputs on the other channels. This unfortunate situation causes an apparent "jitter" in the reported value for any particular resistive value. Likewise, variances in the loading of the processor can also contribute to apparent jitter.

Finally, due to design factors such as the speed of the PC processor, manufacturing variances, component aging, operating temperature, length and quality of cabling to the peripheral, and connection resistance, actual values read via resistive inputs vary widely requiring calibration of the game adapter interface to the resistive inputs. While the game adapter interface 100 can output DC power for powering a peripheral, no control signals can be sent to the peripheral. This limits the ability of the PC to adapt or configure the peripheral attached to the game adapter interface 100. As a result, joystick calibration techniques have been burdensome—often requiring a user to manually move a joystick through its maximum and minimum ranges of motion in a calibration cycle.

Coupling peripheral switches directly to a conventional resistive-ladder multiplexer as proposed in the U.S. Pat. No. 5,459,487 issued to Bouton and incorporated herein by reference, only increases the number of switches providing peripheral inputs to a game adapter interface. Communication to a heavily-loaded PC is not enhanced by this design, nor is contention detection and calibration provided. Also, the ability of a resistive-ladder multiplexer to resolve greater numbers of directly connected analog switch signals in Bouton is limited. For example, as the inventors have discovered, in a resistive ladder, the spacing between multiplexed values is generally much less at the lower end of the resistive range than at the high end of the resistive range. This becomes problematic as the number of multiplexed inputs increases, because without a reasonable amount of separation, it is difficult for the PC to accurately discriminate between one value and another. Thus, when resistive values vary, jitter, or drift due to the afore-mentioned reasons, the PC cannot accurately decode the multiplexed signals.

What is needed then is an interface which is compatible with an existing game adapter interface (i.e. full-port or half-port adapters) but which expands the capacity and operation of a game adapter interface to accommodate more than two momentary peripheral inputs, accounts for the operational latency of a heavily-loaded PC processor, resolves contention between multiple momentary inputs to detect a first-arriving input or a sequence of inputs, and enables automatic calibration of peripheral inputs by a PC processor.

SUMMARY OF THE INVENTION

The present invention provides a method and apparatus for communicating peripheral input information through a game adapter interface to a personal computer processor. A controller reads switch signals output from one or more switch arrays to detect switch activity. The controller conditions and outputs digital switch activity signals representative of the detected switch activity. A multiplexer multiplexes the digital switch activity signals output from the controller to obtain an analog switch activity signal having a value indicative of said detected switch activity. The switch activity detected by the controller can include a first switch activation among contending switches in the switch array and/or a current switch array activation state.

According to a further aspect of the present invention, the controller includes a signal conditioner for conditioning the digital switch activity signal to be asserted for a predetermined duration at least equal to a polling latency of a personal computer processor. In this way, even rapid, momentary peripheral inputs through the switches are detected by a heavily-loaded PC processor through the game adapter interface. The signal conditioner can also assert an analog switch activity on one analog channel at a time in order to avoid any perturbation in the analog value read by the PC processor due to the presence of an analog switch activity signal at the other analog channel of the game adapter interface.

The controller further outputs a digital report signal having a digital value indicating that switch activity has been detected. In particular, one or more semaphores are output to the game adapter interface as an indication of valid multiplexing activity or calibration activity. An active multiplexing condition is reported to indicate when a stable analog value output from the multiplexer is available. As a result, a personal computer processor will poll a reliable, steady-state analog switch activity signal from the game adapter interface.

The semaphore reports a calibration period during times of switch inactivity such as power-up and when the controller detects no switch has been activated in the switch array. During calibration, the controller further outputs a sequence of digital signals having different binary values such that a respective multiplexer outputs a profile of analog values covering each different combination of switch activities. In this way, the controller allows a PC processor to automatically calibrate its method for decoding analog signals during a calibration period reported by the semaphore, using the analog profile output from the multiplexer.

In one example consumer game product using the present invention, "slammer" and "selector" buttons provide multiple player inputs through respective slammer and selector switch arrays. A controller detects a first activated slammer in the first slammer switch array and provides a first conditioned, digital signal representative of the detected first slammer switch activation to a first multiplexer. The controller detects selector switch activity in the second selector switch array and outputs a second conditioned, digital signal representative of the detected current selector switch array activation state to a second multiplexer.

In another example of the present invention involving relatively fewer switches, either or both of the first and second multiplexers are omitted. In the absence of multiplexers, the digital switch activity signals output from the controller are coupled directly to respective analog and/or digital channels of the game adapter interface. The controller operation for generating and conditioning a digital switch activity signal remains substantially the same but only one switch is effectively monitored per available analog or digital channel at the game adapter interface.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

Figure 1:
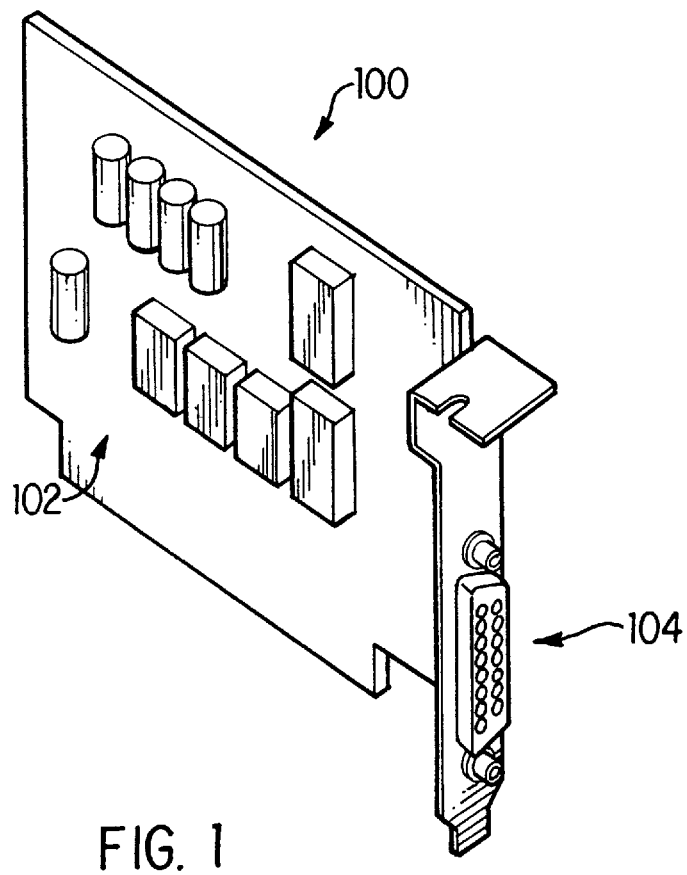
FIG. 1 depicts a game adapter interface card.

The present invention will now be described with reference to the accompanying drawings. In the drawings, like reference numerals indicate identical or functionally similar elements. Additionally, the left-most digit(s) of a reference number typically identifies the drawing in which the reference number first appears.

DETAILED DESCRIPTION OF THE PREFERRED EMBODIMENTS

Table of Contents

| | |
|---|---|
| Overview | 10 |
| Consumer Game Product | 10 |
| Controller Block Diagram | 12 |
| Controller Circuit Diagram | 15 |
| Controller Operation | 17 |
| Slammer Switch Array Signal Processing | 18 |
| Selector Switch Array Signal Processing | 20 |
| Controller Output Signal Timing | 22 |
| Calibration | 25 |
| Switch Monitoring Without Multiplexing | 26 |
| Conclusion | 27 |

Overview

The present invention uses a peripheral-computer interface where switches are not coupled directly to a game adapter interface, but are instead scanned and processed by a controller which communicates with a PC across a game adapter interface. The controller uses signal conditioning, semaphoring, and timing to communicate switching information from a number of switches through the relatively few analog and digital channels available in a game adapter interface. Conditioned digital signals representative of detected switch activity are output from the controller to multiplexers to carry the signals on analog channels. Digital channels provide semaphores which identify when the multiplexed data is stable and when calibration data is available.

Embodiments of the present invention are now described with reference to FIGS. 3 to 8. While specific environments, configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other environments, devices, and applications.

Consumer Game Product

Figure 3:
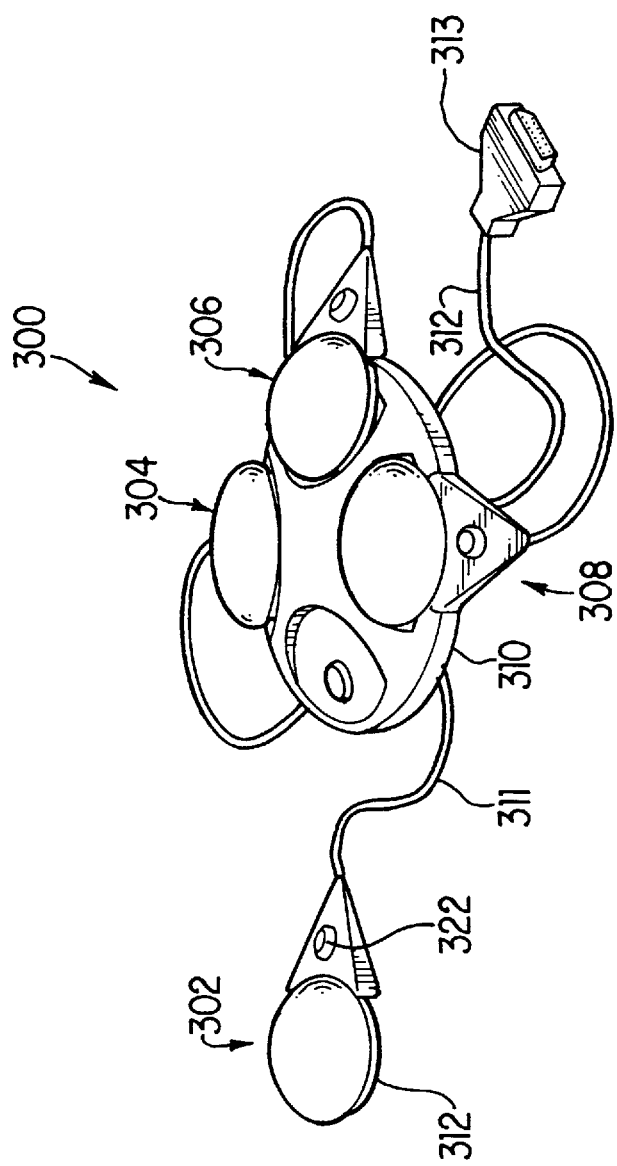
FIG. 3 is a diagram showing a perspective view of a consumer game product suitable for implementing the present invention.

FIG. 3 shows a perspective view of a consumer game product 300 which incorporates the invention. In this example embodiment, a cluster of four hand-held player devices 302–308 are electrically connected to a central body 310. Four pods are molded in the central body 310 for conveniently holding the hand-held players devices during storage or periods of non-use.

Each hand-held device 302–308 incorporates two buttons. For instance, the hand-held device 302 has a large button 312 and a small button 322. Both buttons 312, 322 are electrical connected through a multiconductor cable 311 to a controller (not shown) housed in the central body 310. There is one switch circuit for each button, or in other words, two switch circuits for each hand-held player device.

Each button is connected to switch contacts for making or breaking a respective switch circuit between the button and the central body 310. When a player presses a large or small button (i.e. 312 or 322), the contacts of a small switch underneath the button are closed which completes the respective electrical switch circuit.

In one implementation of the present invention, the large buttons form an array of "slammers" and the small button form an array of "selectors." Slammers and selectors are utilized differently in a game. First, hits by players on their slammer buttons are detected during a game to determine which slammer was hit first or the order in which slammers were hit. Player inputs to their respective selector buttons are evaluated to determine whether each selector button has been activated or un-activated. In this way, the activation or de-activation of each player selector button can be detected.

Figure 2:
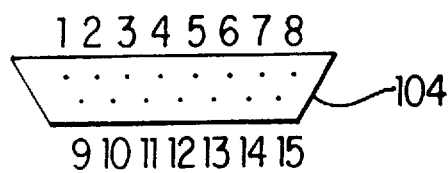
FIG. 2 shows a fully-implemented 15-pin game adapter interface socket connector.

The central body 310 further has a multi-conductor cable 312 which terminates in a game interface socket connector 313 for connection to a game adapter interface. The game adapter interface is typically an adapter card resident within a PC as described previously with respect to FIG. 1. Preferably, the adapter card terminates with a 15-pin DB-15 female socket connector, as shown in FIG. 2, for mating with the game interface socket connector 313.

The structure and operation of a controller for coupling peripheral inputs to a game adapter interface according to the present invention will be described with respect to FIG. 4 to 8.

Controller Block Diagram

Figure 4:
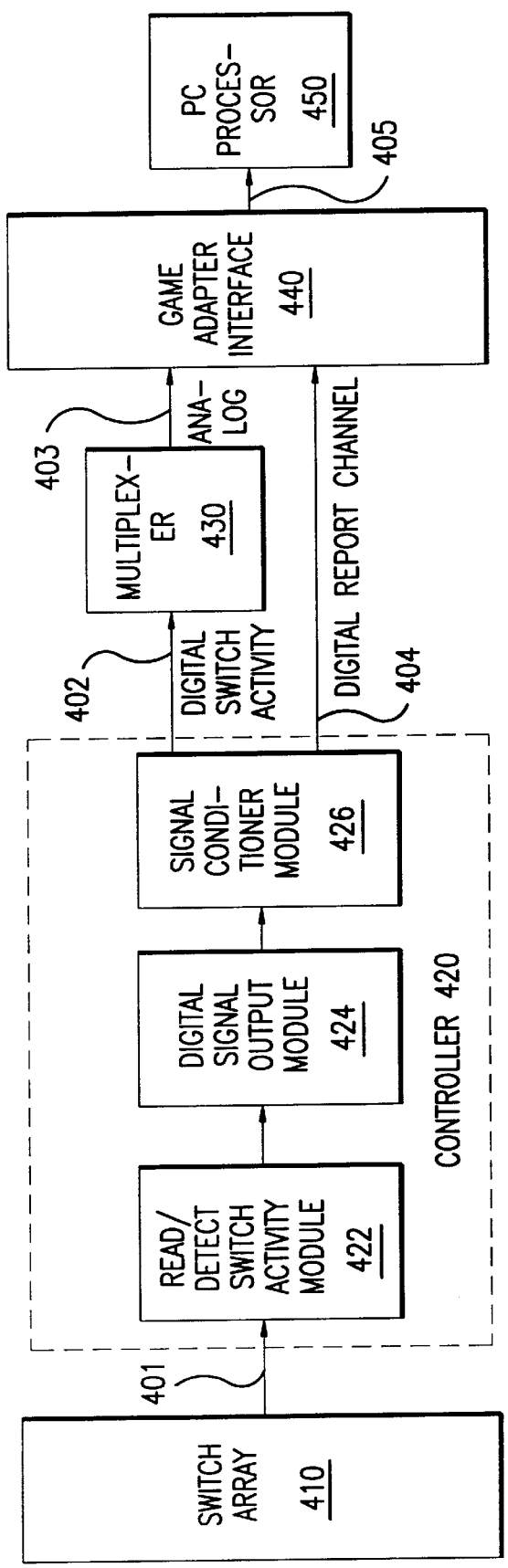
FIG. 4 is a block diagram illustrating one embodiment of the present invention.

FIG. 4 is a block diagram of a preferred embodiment of the present invention. A controller 420 is coupled between one or more switch arrays 410 and a game adapter interface 440 for communicating peripheral inputs from switch array 410 to a heavily-loaded PC processor 450. According to the present invention, the game adapter interface 440 and PC processor 450 can be conventional components found in many types of personal computer systems including: IBM, IBM PC-compatible, and Apple personal computers.

The controller 420 includes a Read/Detect switch activity module 422, a digital signal output module 424, and a signal conditioner module 426. Multiple switches in one or more switch arrays 410 are connected through multiple connection lines 401 to the read module 422. Read/Detect module 422 scans the switches to detect a peripheral input, that is, when a button has been momentarily depressed and released by a game player. When multiple switches are possibly activated simultaneously or near-simultaneously, a contention detection module (not shown) can be included to detect the first switch to be activated.

Further, as would be apparent to one skilled in the art given this description, a signal de-bouncing facility (not shown) can also be provided in the read module 422 as well to avoid characterizing transient detected signals as separate switch inputs. For example, a signal de-bounce module can filter switch "bounce" inputs resulting from the arcing when switch contacts are very close so that only one peripheral switch signal is read and detected for a button depression.

Digital signal output module 424 generates digital switch activity signals representative of the switch states for each switch in switch array(s) 410. In a calibration mode, digital switch activity signals are generated for each switch in a predetermined sequence to allow the PC 450 to calibrate prior to receiving switch inputs.

Signal conditioner 426 is provided to adjust the duration and sequencing of digital switch activity signals. In particular, the duration is predetermined to account for the settling time of an analog channel 403 as it changes from one signal level to the another signal level and for the polling latencies of the PC processor 450 when under a heavy load. Buffering, delay algorithms, and other output queuing techniques can be used to ensure that all switch transitions are transmitted as corresponding digital switch activity signals.

Conditioned digital switch activity signals representative of the detected switch states are asserted on one or more digital channels 402 for output to a multiplexer system 430. Multiplexer system 430 converts each digital switch activity signal into an analog switch activity signal for transmission through a respective one of the analog channels 403 in the game port adapter interface 440.

Controller 420 further reports whether a peripheral input has been detected to the game port adapter interface 440 through one or more digital report channels 404. In one preferred embodiment, a semaphore is output on a respective digital channel 404 to report an active switch detection condition and/or a calibration period for a corresponding analog switch activity signal.

In a consumer game product 300, controller 420 and multiplexer system 430 can be housed with the central body 310 and coupled between the hand-held devices 302–308 and the multi-conductor output cable 312. The game adapter interface 440 is typically an adapter card resident within the PC 450 as described previously with respect to FIG. 1. In this way, controller 420 housed within the central body 310 communicates peripheral switch inputs to the adapter card via a 15-pin game adapter interface socket connection. As would be apparent to one skilled in the art, the PC processor 450 communicates internally with such an adapter card, for example, via a standard ISA or MCA bus 405.

Controller 420 comprises an electronic control logic processor. Controller 420, including any of the constituent modules 422 to 426, can be implemented in hardware, software, and/or firmware. For example, as would be apparent to one skilled in the art given the above description, a processor, microprocessor, embedded microcontroller, and/or integrated logic circuit board can implement the functions of controller 420 and its constituent modules 422–426. Further, controller 420 and modules 422–426 can be constructed as discrete components or a single custom component.

Multiplexer system 430 can be implemented through any digital-analog conversion technique for each digital channel 402 and analog channel 403. Hardware, software, and/or firmware can be used for performing multiplexing operations. Preferably, one or more switched resistance arrays are used to inexpensively multiplex respective digital channels 402 to corresponding analog channels 403.

The inventors have further recognized that certain PC processors 450 skew the magnitude of analog values received through a game adapter interface when two analog channels 403a and 403b are read simultaneously or nearly simultaneously. For example, for an IBM-compatible personal computer running on a Windows 95 platform, values read from one analog channel of a game adapter interface are skewed by the values read simultaneously on the other analog channel. Such perturbations might be due to the nature of a specific game port driver software algorithm or the optimizing nature of current high-performance microprocessors.

The present invention provides further signal conditioning to ensure that a PC processor 450 accurately reads analog values through the game adapter interface 440. Signal conditioning module 426 minimizes or eliminates times in which analog signals are asserted simultaneously on two analog channels 403a and 403b of the game adapter interface 440. Signal conditioner module 426 buffers and holds digital switch activity signals to allow a heavily-loaded PC processor to poll stable analog values as described above.

The signal conditioner module 426 further outputs digital switch activity signals over only one corresponding digital channel 402a or 402b at a time. For instance, during active switch periods, the signal conditioner module 426 can alternate between outputting switch activity signals on digital channel 402a and digital channel 402b. As a result, only one analog channel 403a or 403b at a time asserts a steady-state, multiplexed analog value at the game adapter interface 440. Similarly, only one corresponding semaphore at a time reports an active switch detection condition on the respective digital report channels 404a or 404b.

In an alternate embodiment, only a single analog channel (403a or 403b) is used. At any time, the contents of that analog channel (i.e., whether it contains slammer or selector or calibration data) are indicated by a set of semaphores carried by the digital channels (404a and 404b). For example, two digital semaphores can be used to identify the contents of an analog channel (403a or 403b) as shown in the following Table 2.

TABLE 2

| Digital Channels | | Contents of Analog Channel |
|---|---|---|
| 404 a | 404 b | (403 a or 403 b) |
| 0 | 0 | Invalid Data |
| 0 | 1 | Slammer Data Available |
| 1 | 0 | Selector Data Available |
| 1 | 1 | Calibration |

Controller Circuit Diagram

Figure 5A:
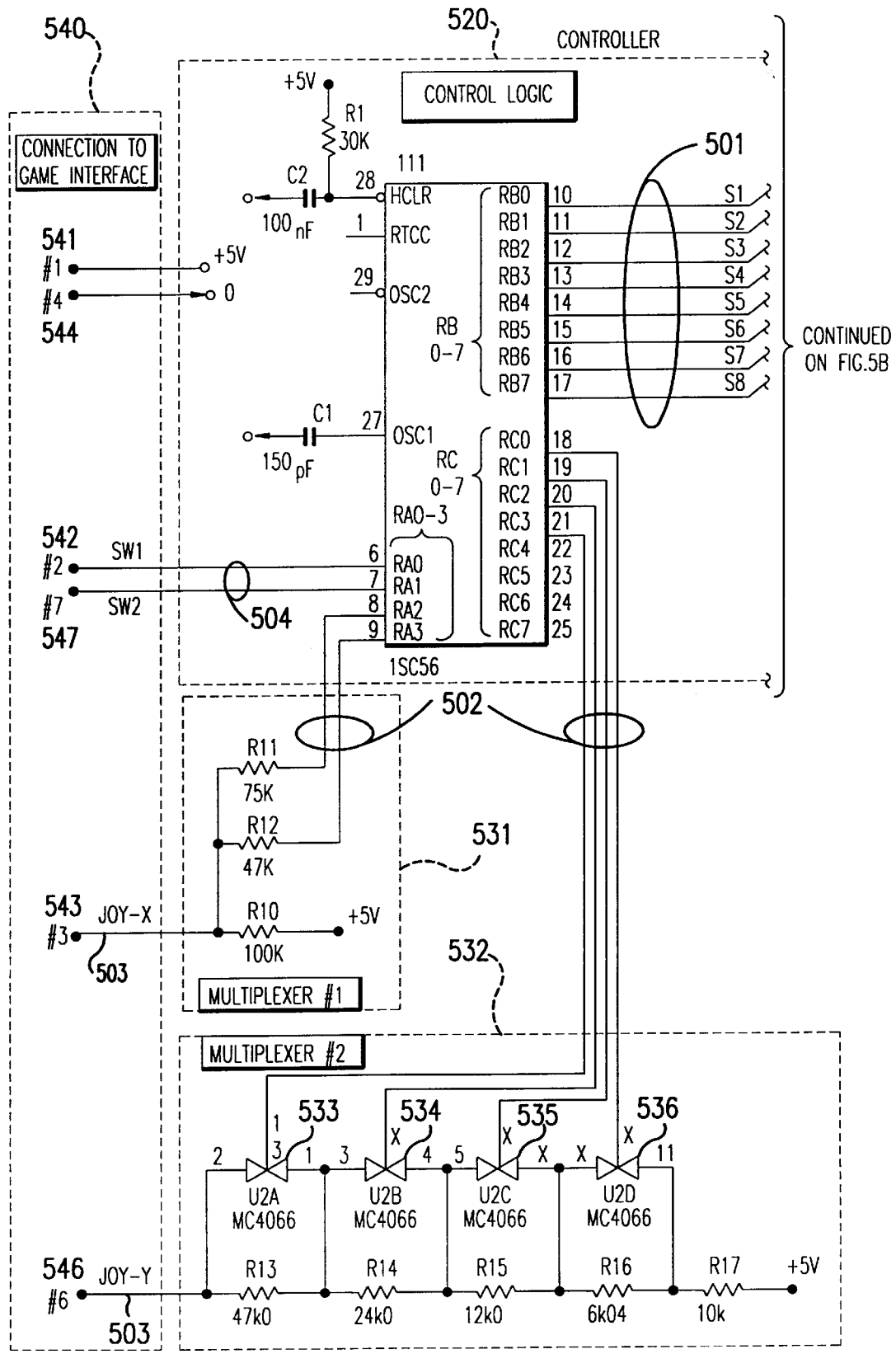
FIG. 5 is a circuit diagram showing for another embodiment of the present invention.
Figure 5B:
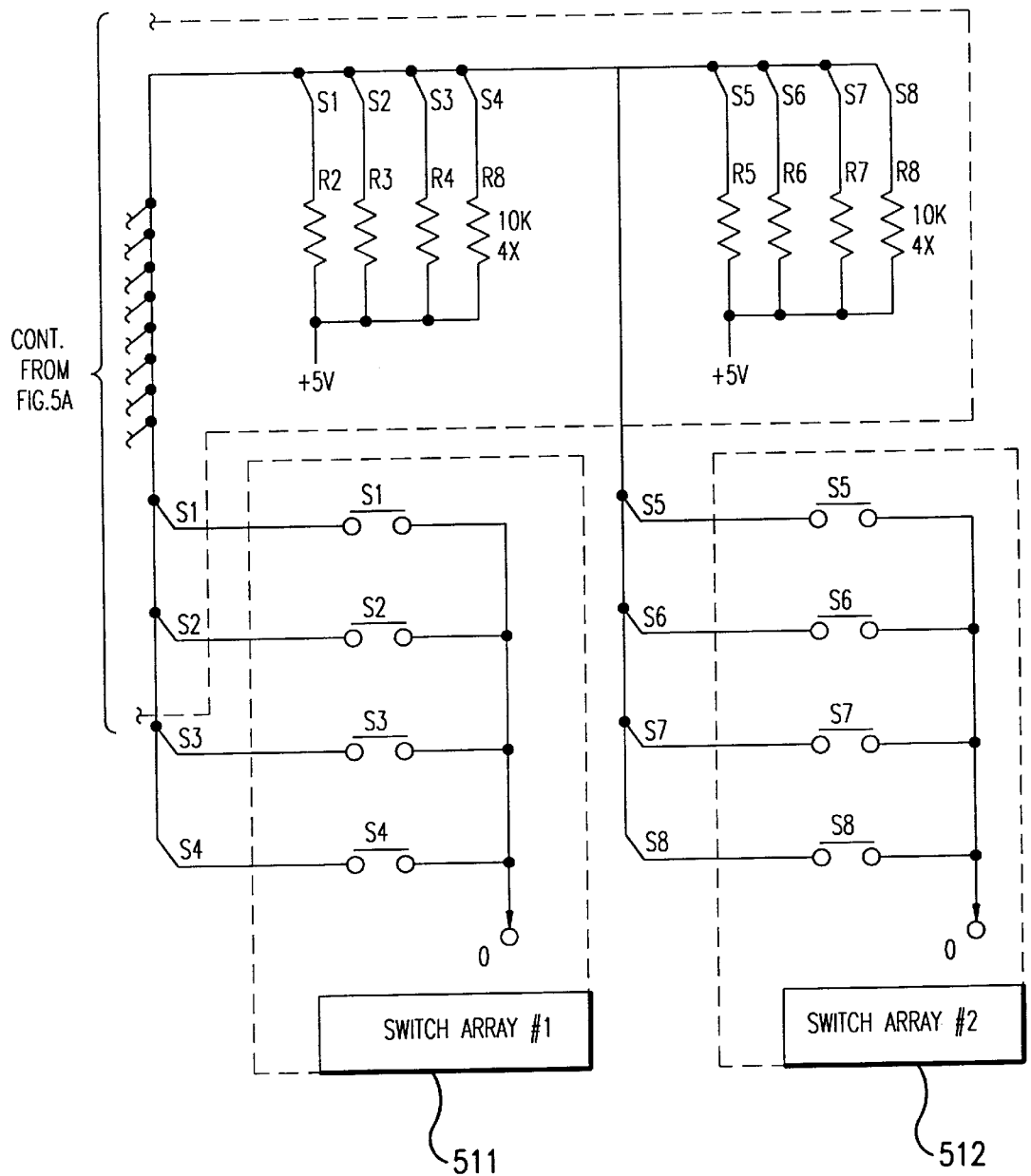

FIG. 5 is a circuit diagram for a preferred embodiment of the present invention. Two arrays of momentary switches 511 and 512 are provided. For example, in the consumer game product 300 discussed above, each of every hand-held device 302–308 contains two switches corresponding to the large and small buttons. Switch array 511 corresponds to four switches S1–S4 receiving inputs from the four large buttons respectively. Switch array 512 corresponds to four switches S5–S8 receiving inputs from the four small buttons respectively.

Switch arrays 511 and 512 are connected to a controller 520 through a group of connection lines 501. As evident from FIG. 5, closing any of switches S1 to S8 results in a make or break connection in a respective switching circuit. For example, when switch S1 is open (i.e., a button is not depressed), a "high" 5 volt signal appears at pin RB0. Conversely, when switch S1 is closed, a circuit is formed and a "low" ground voltage appears at pin RB0. Pins RB1 to RB7 likewise have a high or low potential indicative of the switching activity of switches S2 to S8.

Switches S1 to S8 are directly attached to the microcontroller U1 pins in FIG. 5. As would be apparent to one skilled in the art, alternative switching techniques can be used to input switch activity. For example, keyboard switch matrix techniques can be used to map switch signals to the U1 pins RB0–RB7. Also, non-momentary switches such as mode switches can also be included in either switch array 511 or 512 or as a separate switch or switch array.

Controller 520 comprises an electronic control logic processor as described previously with respect to FIG. 4. In particular, controller 520 comprises an embedded microcontroller U1 having multiple connection pins. The microcontroller U1 performs each of the functions of a read/detect module, digital signal generating module, and signal conditioning module, as described previously with respect to FIG. 4.

Eight pins (RB0–RB7) are dedicated to sensing switching activity. A first group of pins RA2 and RA3 and a second group of pins RC0 to RC3 each provide digital output signals through respective digital channels 502. Two pins RA0 and RA1 input/output digital signals from microcontroller U1 through digital channels 504. The MCLR pin is connected to a power-up conditioning circuitry including a low pass filter (capacitor C2) and a resistor R1. The OSC1 pin is connected to simple oscillator circuitry including capacitor C1. The RC4 to RC7, RTCC, and OSC2 pins remain available for expansion or uses separate from this invention and need not be described in detail herein.

Two output lines 502 from the micro-controller U1 at pins RA2 and RA3 are connected to a first multiplexer 531 which is a resistor-ladder circuit. Depending upon the combined settings of signals RA2 and RA3, the output of multiplexer 531 will be one of four different analog values on a line 543 attached to pin 3 of the game adapter interface connector 540. Each analog value then corresponds to a particular switch activity.

There is also a direct connection of four output lines from the miicro-controller (pins RC0 through RC3) to a second multiplexer 532. Multiplexer 532 employs several analog switching devices 532–536 in component U28 to provide up to 16 different resistive values on the line 546 attached to pin 6 of the game adapter interface connector 540.

There is also a direct connection of the micro-controller U1 and the game adapter interface through two digital output lines 542, 547 which extend from pins RA0 and RA1 to the game adapter interface connector pins 2 and 7 respectively. In this preferred embodiment, these outputs are asserted when Multiplexer 531 and Multiplexer 532, respectively, contain valid and stable readings which can be read by the PC through the game adapter interface. Both multiplexers 531, 532 are directly controlled by the controller 520.

Controller Operation

Figure 6:
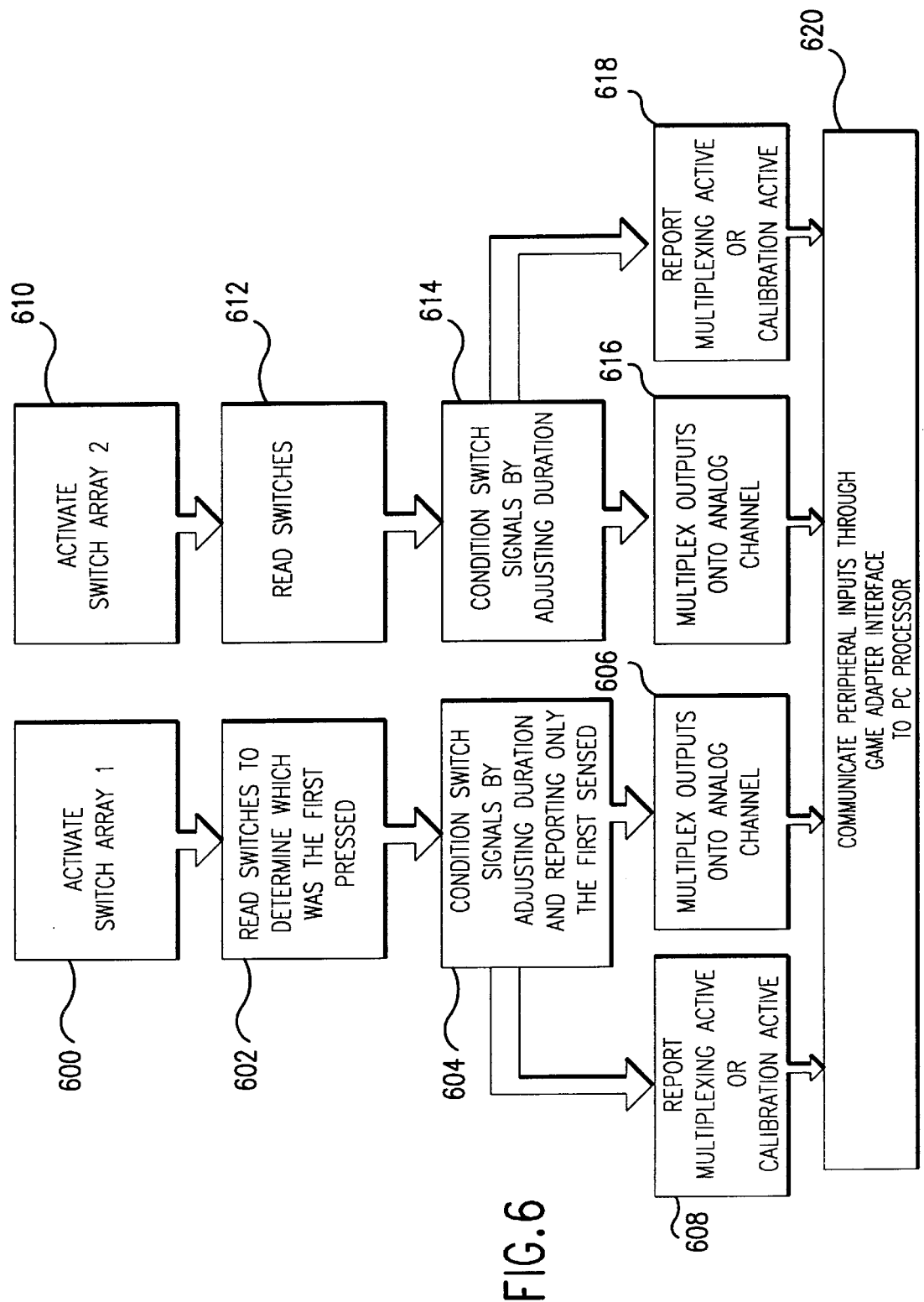
FIG. 6 is a flow diagram showing signal processing according to the present invention.

The operation of the controller 520 will now be described with respect to a diagram of the signal processing performed in controller 520 as shown in FIG. 6.

In gaming applications, multiple players provide player inputs by pressing different buttons on respective hand-held peripheral devices. Different two different types of information regarding such player inputs may be needed by a PC processor 450 during the course of a game. Sometimes it is important in a computer game to identify which player button has been pressed first. Other game routines require only an indication of whether a player button has been pressed. For example, in the consumer game product 300, the large buttons, called slammers, are connected to switch array 511. The small buttons, called selectors, are connected to switch array 512. Controller 520 then processes the switch activity of switch array 511 to communicate which player slammer was first hit. Controller 520 processes the switch activity of array 512 to communicate whether each player selector has been pressed. In other words, the read module 522 reports the current state of each switch S5 to S8 representing the current pattern of selector activation at a given instant.

As shown in FIG. 6, signal processing in controller 520 differs for signal inputs from the switch arrays 511 and 512. Steps 600 to 608 comprise the processing of switch inputs from switch array 511. Steps 610 to 618 comprise the processing of switch inputs from switch array 512.

Slammer Switch Array Signal Processing

In step 600, one or more switches, i.e. player slammers, are activated in switch array 511. In step 601, one or more switches, i.e. player selectors, are activated in switch array 512. Controller 520 reads signaling switches S1 to S4 in switch array 511 to detect the first switch activation. In particular, read module 522 reads high/low inputs from switches S1 to S4 to determine the first switch to be activated during a particular period of time (step 602). Read module 522 reads each switch signal to detect the current pattern of switch activation across the switch array 512. Read module 522 can include well-known contention detection to ensure that a first switch signal is detected and held in step 602 which corresponds to the actual first switch activation even when multiple momentary switch inputs are received. Signal filtering or de-bouncing conditioning can be included to filter noise or false "bounce" switch signal reads from either switch array 511 or 512.

In step 604, a first switch activation signal representing the detected first switch activation is conditioned to adjust the duration of time in which a detected momentary switch input is present. In particular, the first activation switch signal is stored and held for a minimum predetermined period of time to account for the polling latency of a PC processor 450 and/or the recovery time of the multiplexer 531 in changing from one analog value to another.

When PC processor 450 is heavily-loaded, for example, when multiple applications are run simultaneously as in a multimedia environment where a movie video element is being shown, the PC processor 450 can take as long as a quarter second to poll switches. Rapid, momentary switch inputs can come and go in under a quarter second, i.e. in the decisecond or millisecond range, and would escape detection. Contention detection between multiple switch inputs would not be resolved meaning the first activated switch would not be accurately reported.

Through signal conditioning the first switch activation signal is asserted for detection by the processor PC 450. For example, a two-bit binary digital signal is generated based on the reading of the switch inputs and stored for assertion through pins RA2 and RA3. These two-bits identify which of the four switches S1 to S4 was first activated as shown in Table 3 below:

TABLE 3

| First Switch Detected | RA2 output | RA3 output |
|---|---|---|
| S1 | 0 | 0 |
| S2 | 0 | 1 |
| S3 | 1 | 0 |
| S4 | 1 | 1 |

Buffering, delay algorithms, and other output queuing techniques can be used to ensure that all first-detected slammer switch transitions are transmitted as corresponding digital switch activity signals.

In step 606, multiplexer 531 sends the two-bit digital switch activity signal through a resistor-ladder network to produce one of four analog values identifying the first activated switch (S1, S2, S3, or S4). The analog value representing the first activated switch is then output to the game adapter interface (step 620) through the game adapter interface connector pin 543.

During the time a first activation switch signal is held and conditioned, a digital report signal (i.e. a low value) is sent from controller 520 at pin RA0 through the game adapter interface connection pin 542 to report an active switch detection condition, in this case an active multiplexing condition. Otherwise, the digital signal is toggled to an opposite high value to indicate to a PC processor that active calibration can be performed (step 620).

Selector Switch Array Signal Processing

In step 610, one or more switches, i.e. player selectors, are activated in switch array 512. Read module 522 reads signaling switches S5 to S8 in switch array 512 to detect activation or non-activation of each selector switch at a given instant. In particular, read module 522 reads high/low inputs from switches S5 to S8 to determine the current pattern of switch activation across the switch array 512 (step 612). Read module 522 can include signal filtering or de-bouncing conditioning to filter noise or false "bounce" switch signal reads from switch array 512.

In step 614, a switch array state signal representing the detected switch array activations is conditioned to adjust the duration of time in which the detected momentary switch inputs are present. In particular, the switch array activation signal is stored and held for a minimum predetermined period of time to account for the polling latency of a PC processor 450, even during periods of heavy loads, and/or to account for the recovery time of the multiplexer 532 in changing from one analog value to another.

Thus, signal conditioning asserts a digital switch array activation state signal to enable detection by the processor PC 450. For example, a switch array state signal can be held in analog form as received from switches S5 to S8 and converted to a four-bit digital signal. A four-bit binary digital signal is generated based on the reading of the switch inputs and stored for eventual assertion through pins RC0 to RC3. These four-bits identify the range of combinations of current states (activated or non-activated) of the four selector switches S5 to S8. Each bit represents whether a respective switch S5 to S8 is activated (i.e. a low "0" bit value) or non-activated (i.e. a high "1" bit value), as shown in Table 4 below:

TABLE 4

| Switches Activated | | | | Pin Outputs | | | |
|---|---|---|---|---|---|---|---|
| S5 | S6 | S7 | S8 | RC0 | RC1 | RC2 | RC3 |
| Y | Y | Y | Y | 0 | 0 | 0 | 0 |
| Y | Y | Y | N | 0 | 0 | 0 | 1 |
| Y | Y | N | Y | 0 | 0 | 1 | 0 |
| Y | Y | N | N | 0 | 0 | 1 | 1 |
| Y | N | Y | Y | 0 | 1 | 0 | 0 |
| Y | N | Y | N | 0 | 1 | 0 | 1 |
| Y | N | N | Y | 0 | 1 | 1 | 0 |
| Y | N | N | N | 0 | 1 | 1 | 1 |
| N | Y | Y | Y | 1 | 0 | 0 | 0 |
| N | Y | Y | N | 1 | 0 | 0 | 1 |
| N | Y | N | Y | 1 | 0 | 1 | 0 |
| N | Y | N | N | 1 | 0 | 1 | 1 |

TABLE 4-continued

| Switches Activated | | | | Pin Outputs | | | |
|---|---|---|---|---|---|---|---|
| S5 | S6 | S7 | S8 | RC0 | RC1 | RC2 | RC3 |
| N | N | Y | Y | 1 | 1 | 0 | 0 |
| N | N | Y | N | 1 | 1 | 0 | 1 |
| N | N | N | Y | 1 | 1 | 1 | 0 |
| N | N | N | N | 1 | 1 | 1 | 1 |

Buffering, delay alogrithms, and other output queuing techniques can be used to ensure that all detected selector switch array states are transmitted as corresponding four-bit digital switch activity signals.

In step 616, multiplexer 532 sends the four-bit digital signal output through a resistor-ladder network including analog switches 533–536 to produce one of sixteen analog resistance values identifying the current switch array state of switches S5 to S8. The analog value representing the current switch array state is then output to the game adapter interface (step 620) through the game adapter interface connector pin 546.

During the time a switch array state signal is held and conditioned, a digital report signal (i.e. a low value) is sent from controller 520 at pin RA1 through the game adapter interface connection pin 547 to report an active switch detection conditioning i.e. an active multiplexing condition (step 618). Otherwise, the digital signal is toggled to an opposite high value to communicate through the game adapter interface to a PC processor that active calibration can be performed for the selector switch array 532 (step 618).

Finally, this information on peripheral inputs is communicated through the game adapter interface to a PC (step 620). In particular, information regarding the first slammer switch activation and the current selector switch array state is received on respective analog channels (steps 606, 616) through the game adapter interface. Information reporting whether multiplexing or calibration is active for either switch array 511 or 512 is reported through respective digital channels (steps 608, 618).

Controller Output Signal Timing

Figure 7:
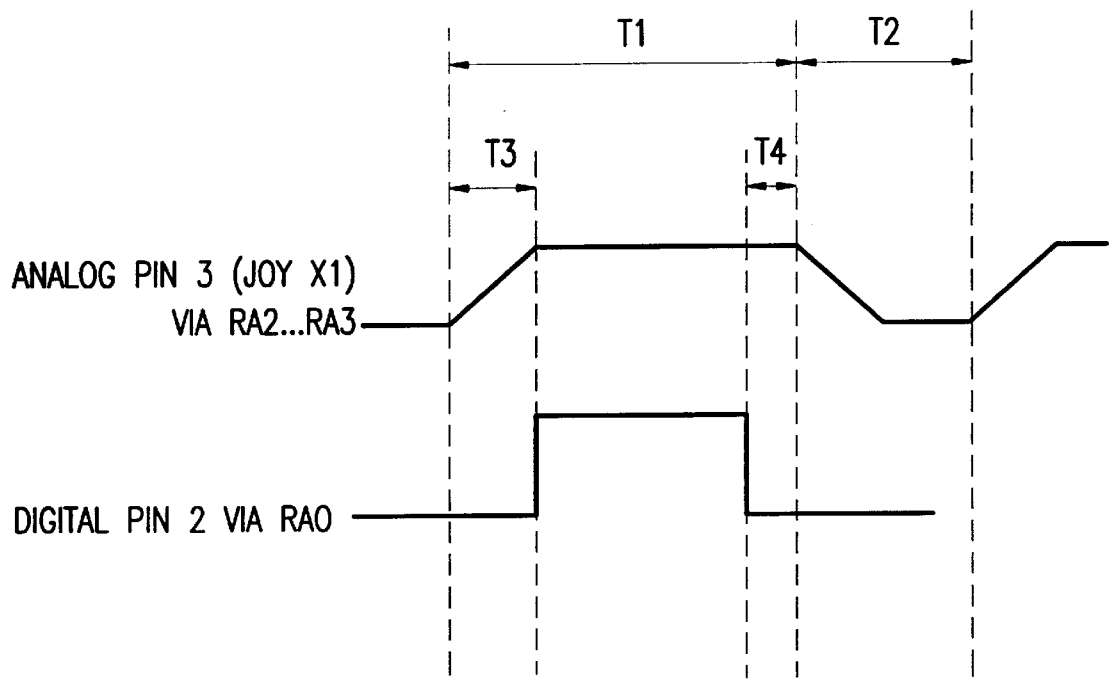
FIG. 7 is a diagram showing the relative timing of an analog switch activity signal and a digital report signal.

FIG. 7 further illustrates an example of the timing used in the signal conditioning processing according to the present invention. As explained above, a signal conditioner module 426 is incorporated to make a detected switch activation signal available for detection by a heavily-loaded PC processor 450. Specifically, controller 520 asserts the first slammer switch activation signal on pins RA2 and RA3 for a minimum predetermined period of time to account for the polling latency of a PC processor 450 and/or to account for the recovery time of the multiplexer 532 or game adapter interface in changing from one analog value to another. Likewise, controller 520 asserts the first slammer switch activation signal on pins RC0 to RC3 for a minimum predetermined period of time to account for the polling latency of a PC processor 450 and/or the recovery time of the multiplexer 532.

For simplicity, FIG. 7 only shows the timing for asserting a first switch activation signal on analog pin 543 via microcontroller pins RA2 and RA3 and a active multiplex/calibration report signal on digital pin 542 via microcontroller pin RA0. These signals are asserted for period of time which extends from the moment of activation of one of the aforesaid switches until the later of either of two events:

either (a) the elapsing of a pre-determined period of time (T1), or (b) the opening of all switches in Switch Array 511. Once either one of these two conditions has happened, the controller 520 de-asserts the output signals at pins RA0, RA2 and RA3. After a subsequent second predetermined period of time (T2) expires, microcontroller 520 resumes scanning switch array 531, whereby, the cycle is capable of being repeated.

As indicated previously, the alteration in assertion of signaling lines (RA2 and RA3) causes multiplexer 531 to change its output signal to the game adapter interface. However, most game adapter interfaces by nature lag in responding to an alteration of an analog signal. Thus, for a period of time, a PC which reads a newly-changed analog signal from circuitry of the game adapter interface will not stably sense the correct actual analog value output by multiplexer 531. For this reason, the controller 531 waits for a period of time (T3), i.e. a millisecond or more, after new signals are asserted on (RA2 and RA3) before asserting a digital semaphore at pin RA0 to report an active multiplexing condition. In this way, a PC processor 450 will poll a valid, steady-state analog value at the game adapter interface.

In addition, the output RA0 is de-asserted by controller 520 at a time period (T4) just prior to the end of the pre-determined time period (T1) at which the controller 520 will change to de-assert the signals on (RA2 and RA3). Scanning of Switch Array 531 resumes after the lapse of time period (T2).

A similar timing process (not shown) is performed in conditioning signals representing the state of switch array 532. Controller 520 asserts a combination of digital signals representing the determined current selector switch array states on pins RC0 through RC3. As described above, the assertion of signaling lines (RC0 through RC3) causes multiplexer 532 to change the analog output signal on an analog pin 546 to the game adapter interface. The controller 520 again waits for a predetermined period of time (T3), i.e. a millisecond or more, after changing the values of new signals on (RC0 through RC3) before asserting a digital output signal on RA1 to report that the value which can be read from the game adapter interface is now stable and valid. Also, the controller 520 de-asserts the signal at pin RA1 a time period (T4) shortly before de-asserting the signals on pins RCO through RC3 at the end of predetermined time period (T1).

As would be apparent to one skilled in the art the exact time durations of each of the times T1 to T4 can be varied and generally are set as a matter of design depending upon the response of the game adapter interface to changing analog values and the polling latency of the PC. For example, T1 can be a half-second and T4 a quarter-second to accommodate quarter-second polling latencies of a heavily-loaded PC processor simultaneously running a multimedia application. T3 and T4 can be on the order of one tenth of a second to accommodate unlikely lags as great as a tenth of a second in a game adapter interface response to analog signal changes.

Signal conditioning was described above with respect to the operation of the controller in buffering and delaying a digital semaphore report signal. Alternatively, some elements of the signal conditioning can be provided by adapting programming in the PC processor. Semaphores are then asserted on digital channels prior to or in conjunction with the assertion of the corresponding digital switch activity signals on the analog channels. The PC programming is then adapted to delay reading of the analog channels for at least a predetermined period of time (T3) after the semaphore report signals are received.

Calibration

Figure 8:
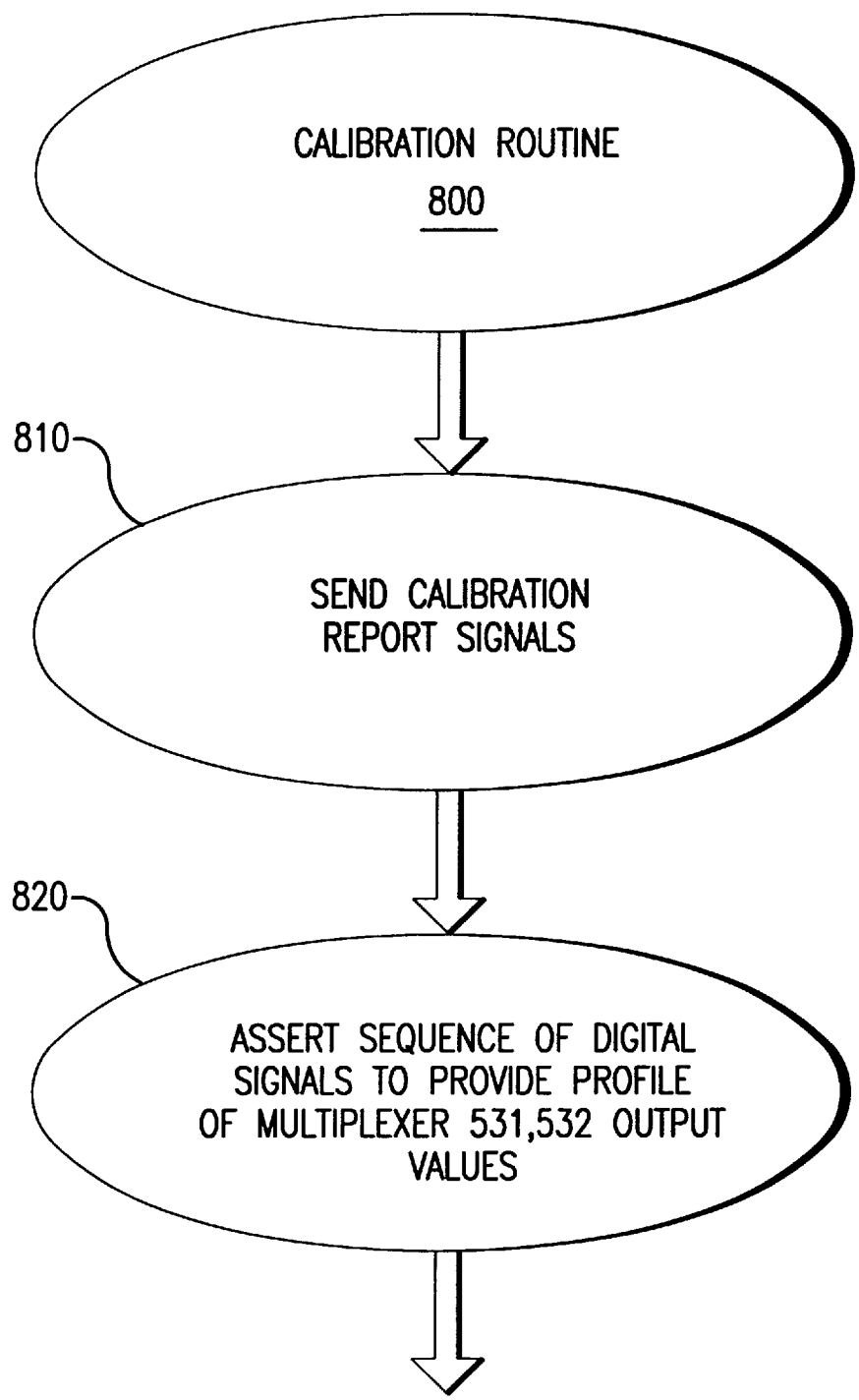
FIG. 8 shows a calibration routine according to the present invention.

FIG. 8 shows a calibration routine 800 according to another feature of the present invention. As described earlier, controller 520 reports periods of switching inactivity through digital channels 504. In particular, calibration active signals (i.e. high "1" signals) are sent from pins RA0 and RA1, either at power-up and/or when switches are not activated (step 810). These digital values on pins RA0 and RA1 corresponding to a calibration active period can be the default settings to ensure frequent calibration. Next, controller 520 asserts a sequence of digital signals to provide profiles of the analog values output from the multiplexers 531 and 532 (step 820).

Thus, when the controller 520 sends "calibration active" signals at the digital pins 542 and 547, the PC processor 450 automatically knows to expect a sequence of analog values for purposes of calibration to be asserted through the analog channels 503 at analog pins 543, 546.

Further, the present invention includes the ability of the controller 420, 520 to use periods of inactivity to generate calibration outputs for communication through the PC game adapter interface. Calibration is performed easily and automatically by a PC without requiring user involvement. By conditioning each multiplexer value output to be asserted for a minimum duration of (T1) beginning after a brief time (T3), a heavily-loaded PC is assured of detecting a stable, reliable calibration value from the game adapter interface. Because the controller 520 further scans different digital signals in sequence through pins RA2 and RA3 and RC0 to RC3, the PC receives stable calibration profiles for the range of analog values output from the multiplexers 531 and 532.

For example, each two-bit digital combination listed in Table 2 is impressed in sequence on pins RA2 and RA3 to obtain a profile of analog values corresponding to the first activations of each slammer switch S1 to S4. Likewise, each four-bit digital combination listed in Table 3 is impressed in sequence on pins RC0 to RC3 to obtain a profile of possible selector switch array states. This allows the PC to automatically gain a calibration profile of the different analog values which can be generated by the invention, and to use these as highly reliable values for de-multiplexing the signals generated by the invention.

Switch Monitoring Without Multiplexing

The above preferred embodiment of the present invention includes multiplexing capability to increase the number of switches which can be detected and reported through the limited number of channels available at a game adapter interface. In another embodiment of the present invention, perhaps involving fewer switches, multiplexing is omitted from one or both of the analog channels. The controller operation remains substantially similar; but with only one switch for each available analog or digital channel, there is no significant requirement for calibration or semaphores. Other advantages of the controller's operation, namely, contention resolution, signal conditioning, and/or calibration can be retained.

For example, consider a modification to FIG. 5 where switch array 511 has only one switch S1. Multiplexer 531 then need not be used. In this case, controller 520 reads and detects switch activity, i.e. the first pressing of switch S1. A switch activation signal representing the detected switch activity of switch S1 is conditioned as described above to stretch the duration of time in which a momentary switch input is present. Buffering, delay algorithms, and other output queuing techniques can be used to ensure that each detected slammer switch transition is transmitted as corresponding digital switch activity signals. One output pin, i.e. RA2, is used to output the conditioned digital signal on line 543 to an analog pin 3 of the game adapter interface connector 540. This digital signal will have an analog value, i.e. either a highor lowvalue, representative of the detected switch activity in switch S1.

Without the multiplexer 531 which generates a profile of analog values for discriminating detected switch activity in multiple switches, the need for calibration is not as great. High and low digital values can be reliably distinguished by the PC processor over time. A corresponding semaphore which reports a calibration period then need not be used. This has the advantage of freeing the digital channel 542 for other uses including asserting conditioned, digital switch activity signals for any one of switches S1–S8.

As would be apparent to one skilled in the art, either or both of multiplexers 531 and 532 can be omitted depending upon the number of switches to be detected. The conditioned, digital switch activity signals output from the controller are coupled directly to respective analog and/or digital channels of the game adapter interface. Thus, without any multiplexing, four switches can still be detected and discriminated using the two available analog channels (lines 543 and 546) and two available digital channels (lines 542 and 547) at the game adapter interface.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A peripheral interface system for communicating peripheral switch activity through a game adapter interface in a personal computer system, comprising:
    at least one switch array outputting switch signals indicating whether respective switches in said at least one switch array have been activated;
    a controller comprising:
        a switch activity detection means for reading said switch signals to detect switch activity, and
        digital signal output means for outputting a digital switch activity signal corresponding to said detected switch activity; and
    a multiplexer for multiplexing said digital switch activity signal output from said controller to obtain an analog switch activity signal having a value indicative of said detected switch activity; wherein
    said controller further comprises
        a signal conditioner for conditioning said digital switch activity signal such that said digital switch activity signal is asserted for at least a predetermined duration.

2. The peripheral interface system of claim 1, wherein said at least one switch array includes a first array of switches, said switch activity detection means reads said switch signals corresponding to said first array of switches to detect a first switch activated among said first array of switches.

3. The peripheral interface system of claim 1, wherein said at least one switch array includes a second array of switches, said switch activity detection means reads said switch signals corresponding to said second array of switches to detect a current switch array activation state.

4. The peripheral interface system of claim 1, wherein said signal conditioner conditions said digital switch activity signal to be asserted for a predetermined duration which extends for at least one millisecond, whereby, a heavily-loaded personal computer processor can detect said analog switch activity signal through the game adapter interface.

5. The peripheral interface system of claim 1,
    wherein said digital signal output means furter outputs at least one digital semaphore signal having a digital value indicating when said digital switch activity signal is output to said multiplexer.

6. The peripheral interface system of claim 1, wherein said digital signal output means further outputs at least one digital semaphore signal and said signal conditioner conditions said at least one digital semaphore signal such that said digital semaphore signal reports an active multiplexing condition indicating the presence of a steady-state analog switch activity signal.

7. The peripheral interface system of claim 1,
    wherein said digital signal output means further outputs at least one digital semaphore signal which reports an active calibration condition.

8. The peripheral interface system of claim 1, wherein said controller further comprises calibration means for controlling said digital signal output means during a calibration period; wherein during a calibration period said digital signal output means outputs:
    a sequence of digital signals having different values such that said multiplexer outputs a profile of analog values covering respective different switch activities in said at least one switch array.

9. A peripheral interface system for use with a game adapter interface in a personal computer system, said game adapter interface having at least one analog channel and at least one digital channel, the peripheral-interface system comprising:
    a first group of switches outputting a first group of switch signals indicating whether respective switches in said first group of switches have been activated;
    a second group of switches outputting a second group of switch signals indicating whether respective switches in said second group of switches have been activated;
    a first reading means for reading said first group of switch signals to detect a first activated switch within said first group of switches;
    a second reading means for reading said second group of switch signals to detect a current state of said second group of switches representing whether each switch in said second group of switches is activated;
    digital signal outputting means for outputting first and second groups of digital signals, said first group of digital signals identifying said first activated switch detected by said first reading means, and said second group of digital signals identifying said current state of said second group of switches detected by said second reading means; and
    signal conditioning means for conditioning said first and second groups of digital signals; and at least one multiplexer means for multiplexing said first and second groups of digital signals conditioned by said signal conditioning means and outputting corresponding first and second analog signals over at least one analog channel at the game adapter interface, said first analog signal having an analog value identifying said first activated switch in said first group of switches and said second analog signal having an analog value identifying said current state of said second group of switches;

wherein said signal conditioning means asserts each of said first and second groups of digital signals for a predetermined duration, said predetermined duration being sufficiently long to enable said respective first and second analog signals to be asserted at the game adapter interface for a steady-state duration which is longer than a polling latency of a personal computer processor connected to the game adapter interface.

10. The peripheral interface system of claim 9, wherein said first reading means includes contention detecting means for analyzing the order of said first group of switch signals to detect said first activated switch.

11. The peripheral interface system of claim 9, further comprising digital semaphore outputting means for outputting at least one digital semaphore on the at least one digital channel of the game adapter interface, wherein said at least one digital semaphore reports an active multiplexing condition.

12. The peripheral interface system of claim 9, further comprising calibration means for controlling said digital signal outputting means during a calibration period; wherein during a calibration period said digital signal outputting means outputs at least one of:

a sequence of said first digital signals having different values such that said at least one multiplexer means outputs a first profile of analog values covering respective first switch activations of each switch in said first switch array; and a sequence of said second digital signals having different values such that said at least one multiplexer means outputs a second profile of analog values covering respective second switch array states.

13. The peripheral interface system of claim 12, further comprising:

digital semaphore outputting means for outputting at least one digital semaphore on said at least one digital channel of the game adapter interface, wherein said at least one digital semaphore reports an active multiplexing condition or a calibration period.

14. The peripheral interface system of claim 9, wherein said signal conditioning means conditions said first and second groups of digital signals such that only one of said first and second analog signals is output to the game adapter interface at a time.

15. An electronic interface system for communicating peripheral input information through at least one analog channel and at least one digital channel of a game adapter interface to a computer processor, comprising:

a switch array comprised of a plurality of switches outputting switch signals indicating whether the switches have been activated by peripheral inputs;

a controller, coupled to said switch array, wherein said controller processes said switch signals to detect switch activity, generates a digital semaphore reporting a detected switch activity through an digital channel to the computer processor, and generates a digital switch activity signal representative of the detected switch activity; and a multiplexer coupled to said controller for multiplexing said digital switch activity signal from said controller to obtain an analog signal having a value indicative of the peripheral input information, said analog signal being output through an analog channel for transmission to the computer processor.

16. An electronic interface method for communicating switching activity in a number of switches through at least one analog channel and at least one digital channel of a game adapter interface to a computer processor, the method comprising the steps of:

generating switch signals indicating whether the switches have been activated;

reading said switch signals to detect switch activity;

generating and outputting a digital semaphore through a digital channel to the computer processor when switch activity is detected;

generating a digital switch activity signal representative of the detected switch activity;

multiplexing said digital switch activity signal to obtain an analog switch activity signal having a value indicative of the detected switch activity; and outputting said analog switch activity signal through an analog channel for transmission to the computer processor.

17. The method of claim 16, wherein said reading step includes the step of detecting contention between switch signals.

18. The method of claim 16, further comprising the step of conditioning said digital switch activity signal such that said digital switch activity signal is asserted for a predetermined duration at least equal to a polling latency of the computer processor to enable said analog switch activity signal to be detected by the personal computer processor.

19. The method of claim 16, further comprising the step of:

conditioning said digital semaphore to report an active multiplexing condition a predetermined time period after a switch activation is detected such that the computer processor will receive said analog switch activity signal in a steady-state.

20. The method of claim 16, wherein said digital semaphore generating step further reports a calibration period through the digital channel to the computer processor.

21. The method of claim 20, further comprising the steps of:

generating a sequence of digital signals during said calibration period;

multiplexing said sequence of digital signals during said calibration period to generate a calibration profile of analog values covering a range of switch activities; and outputting said calibration profile through the analog channel for transmission to the computer processor.

22. A peripheral interface system for use with a game adapter interface in a computer system, said game adapter interface having at least one analog channel and at least one digital channel, the peripheral-interface system comprising:

at least one switch array outputting switch signals indicating whether respective switches in said at least one switch array have been activated; and a controller comprising:

at least one switch activity detection means for reading said switch signals and detecting switch activity;

at least one digital signal output means for generating digital output signals which correspond to said detected switch activity; and signal conditioning means for conditioning said digital output signals such that conditioned digital output signals are asserted at the game adapter interface for a predetermined duration allowing reliable polling by the computer system, wherein said predetermined duration extends for at least one millisecond.

23. A peripheral interface system for use with a game adapter interface in a computer system, said game adapter interface having at least one analog channel and at least one digital channel, the peripheral-interface system comprising:

at least one switch array outputting switch signals indicating whether respective switches in said at least one switch array have been activated; and a controller comprising:
at least one switch activity detection means for reading said switch signals and detecting switch activity;
at least one digital signal output means for generating digital output signals which correspond to said detected switch activity; and
signal conditioning means for conditioning said digital output signals such that conditioned digital output signals are asserted at the game adapter interface for a predetermined duration allowing reliable polling by the computer system, further comprising:
at least one multiplexing means for multiplexing said conditioned digital output signals and outputting a multiplexed analog signal representative of said multiplexed conditioned digital output signals over the at least one analog channel.

24. The system of claim 23, wherein said controller further comprises:

digital semaphore outputting means for outputting at least one digital semaphore on the at least one digital channel of the game adapter interface, wherein said at least one digital semaphore identifies when said multiplexed analog signal is present on the at least one analog channel.

25. The system of claim 23, wherein said controller further comprises:

calibration means for controlling said at least one digital signal output means during a calibration period; wherein during a calibration period said at least one digital signal output means outputs a sequence of digital output signals having different values such that said at least one multiplexing means outputs corresponding analog signals representing a profile of analog values.

26. The system of claim 25, wherein said controller further comprises:

digital semaphore outputting means for outputting at least one digital semaphore on the at least one digital channel of the game adapter interface, wherein said at least one digital semaphore indicates whether an analog signal is being output from said at least one multiplexing means on the at least one analog channel which represents a calibration value or an actual value corresponding to detected switch activity.

27. The system of claim 23, wherein the game adapter interface includes two analog channels and two digital channels and said at least one switch array comprises four switches.

28. A peripheral interface system for use with a game adapter interface in a computer system, said game adapter interface having at least one analog channel and at least one digital channel, the peripheral-interface system comprising:

at least one switch array outputting switch signals indicating whether respective switches in said at least one switch array have been activated; and a controller comprising:
at least one switch activity detection means for reading said switch signals and detecting switch activity;
at least one digital signal output means for generating digital output signals which correspond to said detected switch activity; and
signal conditioning means for conditioning said digital output signals such that conditioned digital output signals are asserted at the game adapter interface for a predetermined duration allowing reliable polling by the computer system, wherein said at least one switch activity detection means includes contention detecting means for detecting a first activated switch in a first switch array of said at least one switch array, and wherein said digital output signals represent the ordinal of said first activated switch within said first switch array.

29. A method for communicating switching activity among a plurality of switches through corresponding game adapter interface channels to a computer processor, the game adapter interface channels including at least one analog channel and at least one digital channel, the method comprising the steps of:

reading switch signals from the switches to detect switch activity;

generating digital output signals representative of detected switch activity;

conditioning said digital output signals such that conditioned digital output signals are asserted at the game adapter interface for a predetermined duration allowing reliable polling by the computer processor; and outputting said conditioned digital output signals over corresponding game adapter interface channels, wherein said predetermined duration is at least equal to a polling latency of the computer processor.

* * * * *